(12) United States Patent
Chiang et al.

(10) Patent No.: US 6,895,015 B1
(45) Date of Patent: May 17, 2005

(54) DYNAMIC TIME SLOT ALLOCATION IN INTERNAL RULES CHECKER SCHEDULER

(75) Inventors: John Chiang, San Jose, CA (US); Shashank Merchant, Sunnyvale, CA (US); Michael VengChong Lau, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 787 days.

(21) Appl. No.: 09/304,964

(22) Filed: May 5, 1999

(51) Int. Cl.[7] .............................................. H04L 12/54
(52) U.S. Cl. ...................................................... 370/429
(58) Field of Search ................................ 370/229, 230, 370/231, 232, 233, 234, 252, 253, 412, 413, 414, 415, 416, 417, 418, 422, 423, 428, 429, 458, 460, 461

(56) References Cited

U.S. PATENT DOCUMENTS

| | | | | |
|---|---|---|---|---|
| 4,805,172 A | * | 2/1989 | Barbe et al. | 370/384 |
| 4,809,270 A | * | 2/1989 | Baxter et al. | 370/458 |
| 4,999,832 A | * | 3/1991 | Chen et al. | 370/369 |
| 5,241,536 A | * | 8/1993 | Grimble et al. | 370/398 |
| 5,255,265 A | * | 10/1993 | Eng et al. | 370/416 |
| 5,515,376 A | * | 5/1996 | Murthy et al. | |
| 5,577,035 A | * | 11/1996 | Hayter et al. | 370/395 |
| 5,594,727 A | * | 1/1997 | Kolbenson et al. | 370/442 |
| 5,771,234 A | * | 6/1998 | Wu et al. | 370/396 |
| 6,069,878 A | * | 5/2000 | Christensen | 370/263 |
| 6,101,198 A | * | 8/2000 | Koenig et al. | 370/535 |
| 6,192,049 B1 | * | 2/2001 | Sohraby | 370/389 |

* cited by examiner

*Primary Examiner*—Kwang Bin Yao

(57) ABSTRACT

The invention provides a novel method of data processing in a multiport communication system having a decision making engine for controlling data forwarding between the receive ports and at least one transmit port. Data blocks representing received data packets are placed in data queues corresponding to the receive ports. The data queues are transferred one at a time in successive time slots to logic circuitry that determines the transmit ports. The time slots are dynamically allocated to the data queues in accordance with data traffic at the corresponding receive ports.

16 Claims, 8 Drawing Sheets

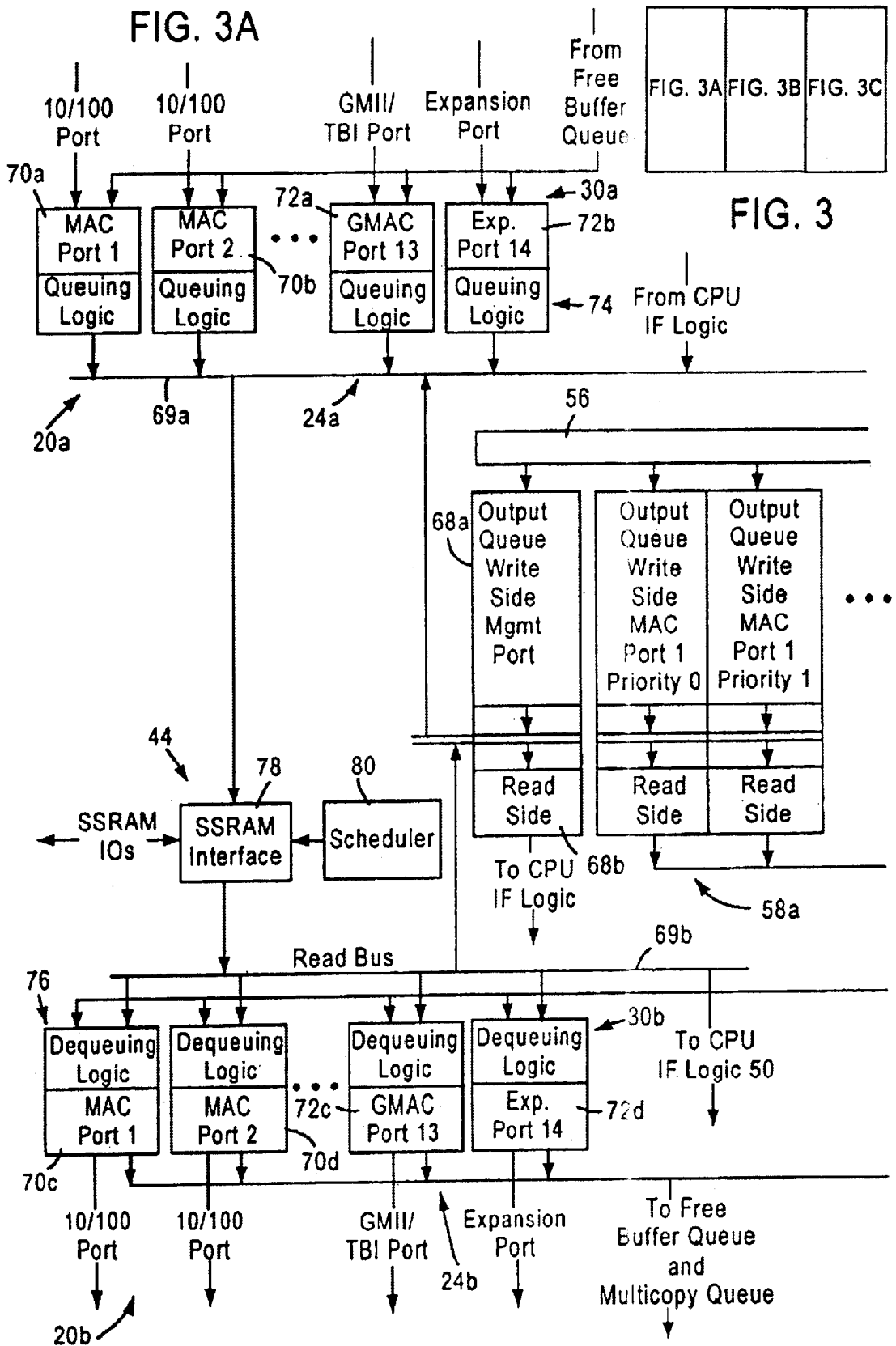

DYNAMIC TIME SLOT ALLOCATION IN INTERNAL RULES CHECKER SCHEDULER

FIELD OF THE INVENTION

This invention relates to data communication systems, and more particularly, to a dynamic mechanism for allocating time slots for processing queues from various ports of a communication switch.

BACKGROUND ART

A multiport communication switch may be provided in a data communication network to enable data communication between multiple network stations connected to various ports of the switch. A logical connection may be created between receive ports and transmit ports of the switch to forward received frames to appropriate destinations. Based on frame headers, a frame forwarding arrangement selectively transfers received frames to a destination station.

In a conventional communication system, each receive port is assigned with a fixed time slot, during which frame headers received from that port are transferred to processing circuitry that determines a destination station. However, data traffic at a given port may vary, so that some of the ports may become overloaded, while the others are underloaded. Hence, when no data are supplied to the frame forwarding arrangement from a given port, the bandwidth allocated to that port is wasted, whereas processing of frame headers from the overloaded ports may be delayed because the bandwidth allocated to them is not sufficient.

Therefore, it would be desirable to provide a frame forwarding arrangement able to dynamically allocate time slots to various ports, in order to more efficiently utilize the assigned bandwidth.

DISCLOSURE OF THE INVENTION

The invention provides a novel method of data processing in a multiport communication system having a decision making engine for controlling data forwarding between receive ports and at least one transmit port. The method includes placing data blocks that represent received data packets in data queues corresponding to the receive ports. The data queues are transferred in successive time slots to logic circuitry that determines the at least one transmit port. The time slots are dynamically allocated to the data queues in accordance with data traffic at the corresponding receive ports.

Preferably, a data queue representing each of the receive ports is assigned with at least one of the time slots. A first time slot assigned to a first data queue is allocated to this data queue if the first data queue contains data to be processed. However, the first time slot is allocated to a second data queue, if the first data queue does not contain data to be processed. For example, the first time slot may be allocated to a data queue assigned with a second time slot following the first time slot. If the second data queue also does not contain data to be processed, the first time slot is allocated to a third data queue assigned with a third time slot following the second time slot.

In accordance with the present invention, the decision making engine for controlling transmission of received data packets to at least one selected transmit port includes a plurality of queuing devices corresponding to a plurality of receive ports. The queuing devices queue data blocks representing data packets received by the corresponding receive ports. Logic circuitry of the decision making engine receives the data blocks from the plurality of queuing devices one at a time in successive time slots to identify the at least one selected transmit port for each data packet. A scheduler interacts with the plurality of queuing devices to dynamically allocate each of the time slots to one of the plurality of queuing devices in accordance with data traffic at the corresponding receive ports.

In a preferred embodiment, the scheduler is configured to receive a request for a time slot from a queuing device when it holds data to be processed by the logic circuitry. Each of the queuing devices is assigned with at least one time slot in each scheduling cycle. A first time slot assigned to a first queuing device may be allocated to a second queuing device assigned with a second time slot following the first time slot, if no request for a time slot is received from the first queuing device. Similarly, the first time slot may be allocated to a third queuing device assigned with a third time slot following the second time slot, if no request for a time slot is received from the second queuing device.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
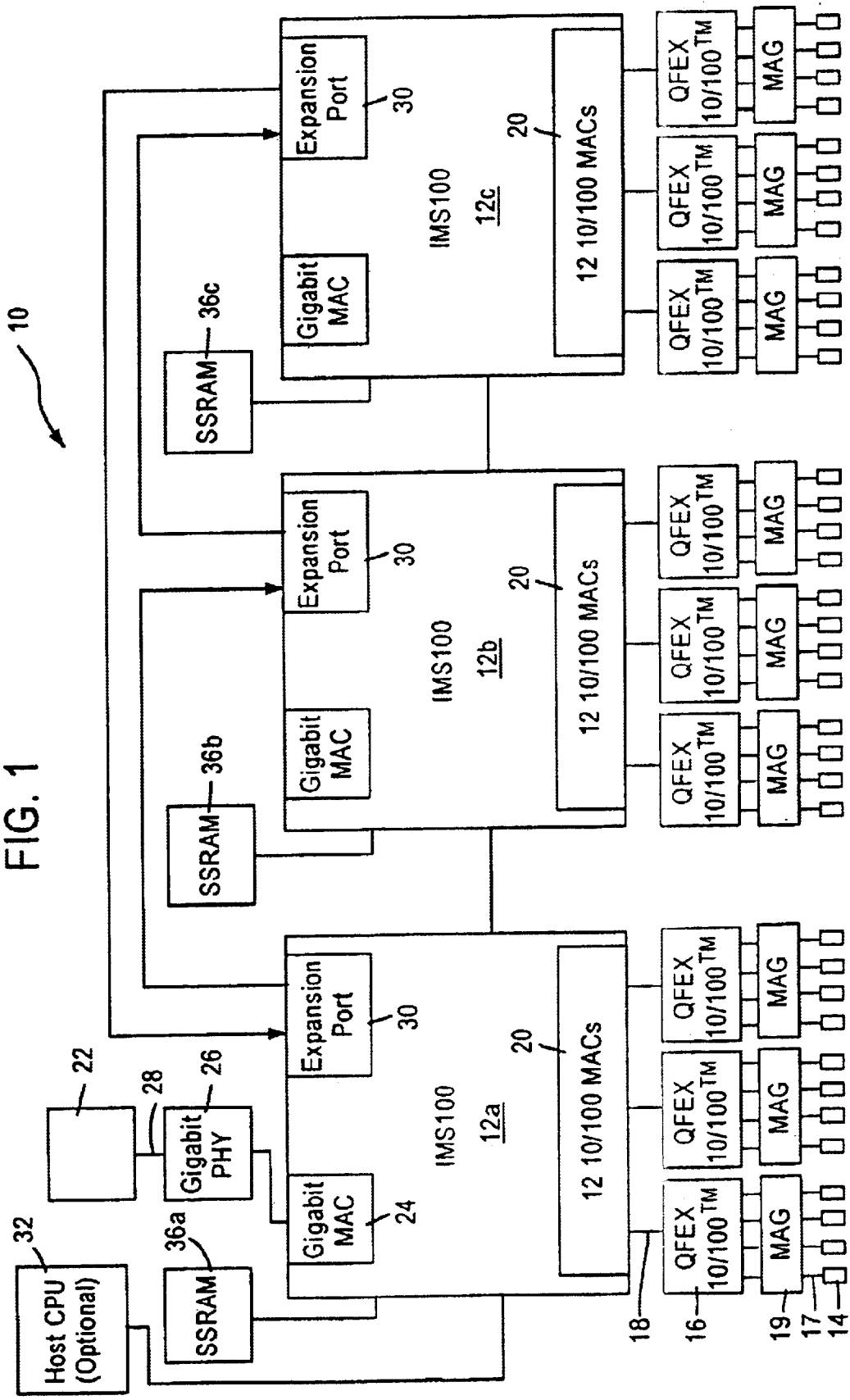
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the switches 12 selectively forward data packets received from the network nodes 14 or 22 to the appropriate destination based upon Ethernet protocol.

Each switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each switch 12 also includes a gigabit MAC port 24 for sending and receiving data packets to and from a gigabit PHY 26 for transmission to the gigabit node 22 via a high speed network medium 28.

Each 10/100 Mb/s network station 14 sends and receives data packets to and from the corresponding switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time after the deassertion of a receive carrier on the media, known as the interpacket gap interval (IPG). If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding switch 12.

Each switch 12 is coupled to 10/100 physical layer (PHY) transceivers 16 configured for sending and receiving data packets to and from the corresponding switch 12 across a corresponding shared media independent interface (MII) 18. In particular, each 10/100 PHY transceiver 16 is configured for sending and receiving data packets between the switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each switch 12 also includes an expansion port 30 for transferring data between other switches according to a prescribed protocol. For example, each expansion port 30 can be implemented as a second gigabit MAC port similar to the port 24, enabling multiple switches 12 to be cascaded together as a separate backbone network.

Figure 2:
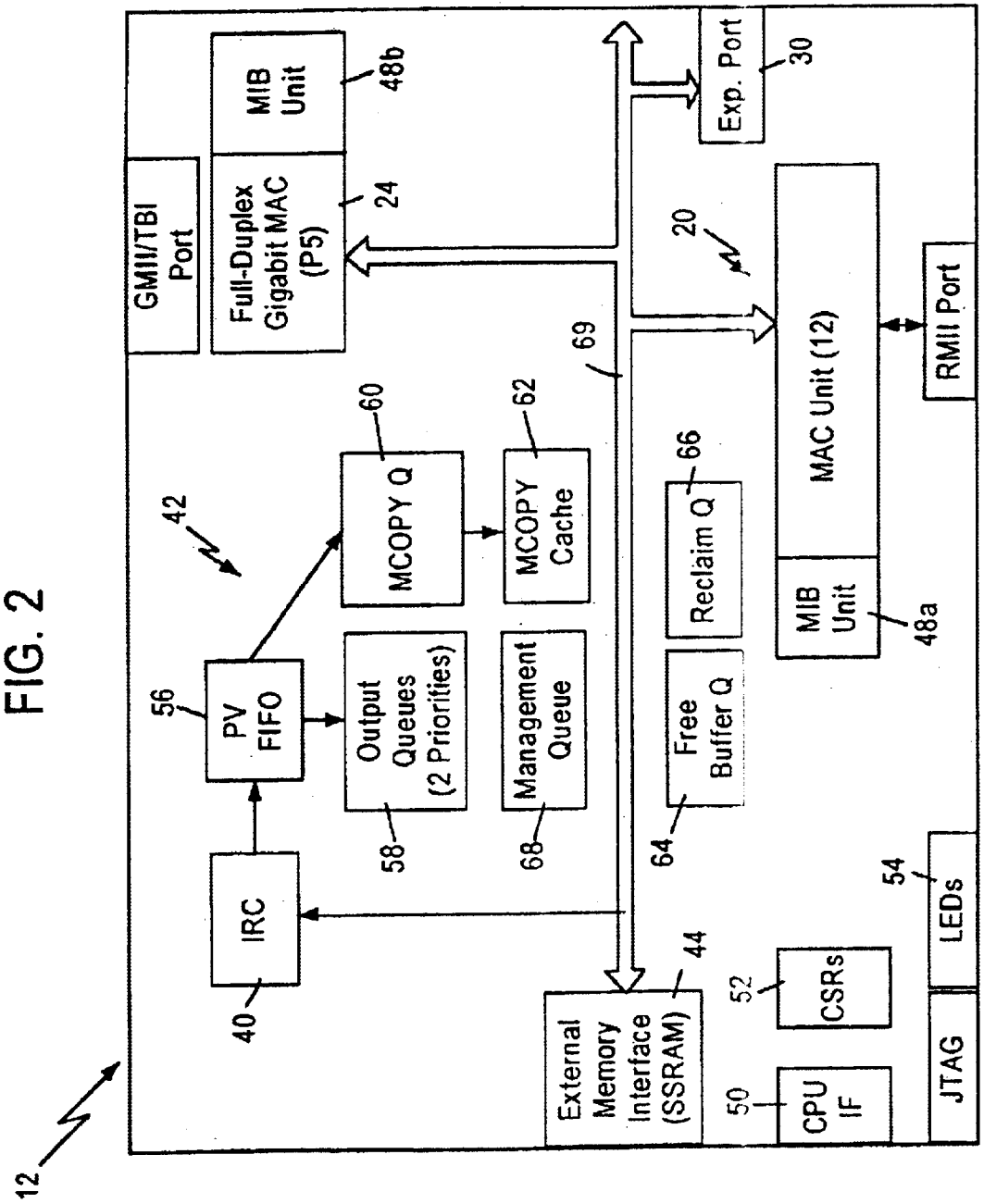
FIG. 2 is a block diagram of the multiple port switch of FIG. 1.

FIG. 2 is a block diagram of the switch 12. The switch 12 contains a decision making engine 40 that performs frame forwarding decisions, a switching subsystem 42 for transferring frame data according to the frame forwarding decisions, a buffer memory interface 44, management information base (MIB) counters 48, and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in a synchronous static random access memory (SSRAM) 36 in order to minimize the chip size of the switch 12. In particular, the switch 12 uses the SSRAM 36 for storage of received frame data, memory structures, and MIB counter information. The memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128 K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The switch 12 also includes a processing interface 50 that enables an external management entity such as a host CPU 32 to control overall operations of the switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The switch 12 also includes an LED interface 54 that clocks out the status of conditions per port and drives external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packets, including source, destination, and virtual LAN (VLAN) address information. The IRC 40 uses the header information to determine which MAC ports will output the data frame stored at the location specified by the frame pointer. The decision making engine may thus determine that a given data packet should be output by either a single port, multiple ports, or all ports (i.e., broadcast). For example, each data packet includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another switch 12 via the expansion port 30. Hence, the internal rules checker 40 will decide whether a frame temporarily stored in the buffer memory 36 should be output to a single MAC port or multiple MAC ports.

The internal rules checker 40 outputs a forwarding decision to the switch subsystem 42 in the form of a forwarding descriptor. The forwarding descriptor includes a port vector identifying each MAC port that should receive the data packet, priority class identifying whether the frame is high priority or low priority, VLAN information, Rx port number, Opcode, and CX frame pointer. The port vector identifies the MAC ports to receive the data packet for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to supplies the frame pointer on a per-port basis The output queues 58 fetch the data packet identified in the port vector from the external memory 36 via the external memory interface 44, and supply the retrieved data packet to the appropriate transmit FIFO of the identified ports. If a data packet is to be supplied to a management agent, the frame pointer is also supplied to a management queue 68, which can be processed by the host CPU 32 via the CPU interface 50.

The multicopy queue 60 and the multicopy cache 62 keep track of the number of copies of the data packet that are fetched from the respective output queues 58, ensuring that the data packet is not overwritten in the SSRAM 36 until the appropriate number of copies of the data packet have been output from the SSRAM 36. Once the number of copies output corresponds to the number of ports specified in the port vector FIFO 56, the frame pointer is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
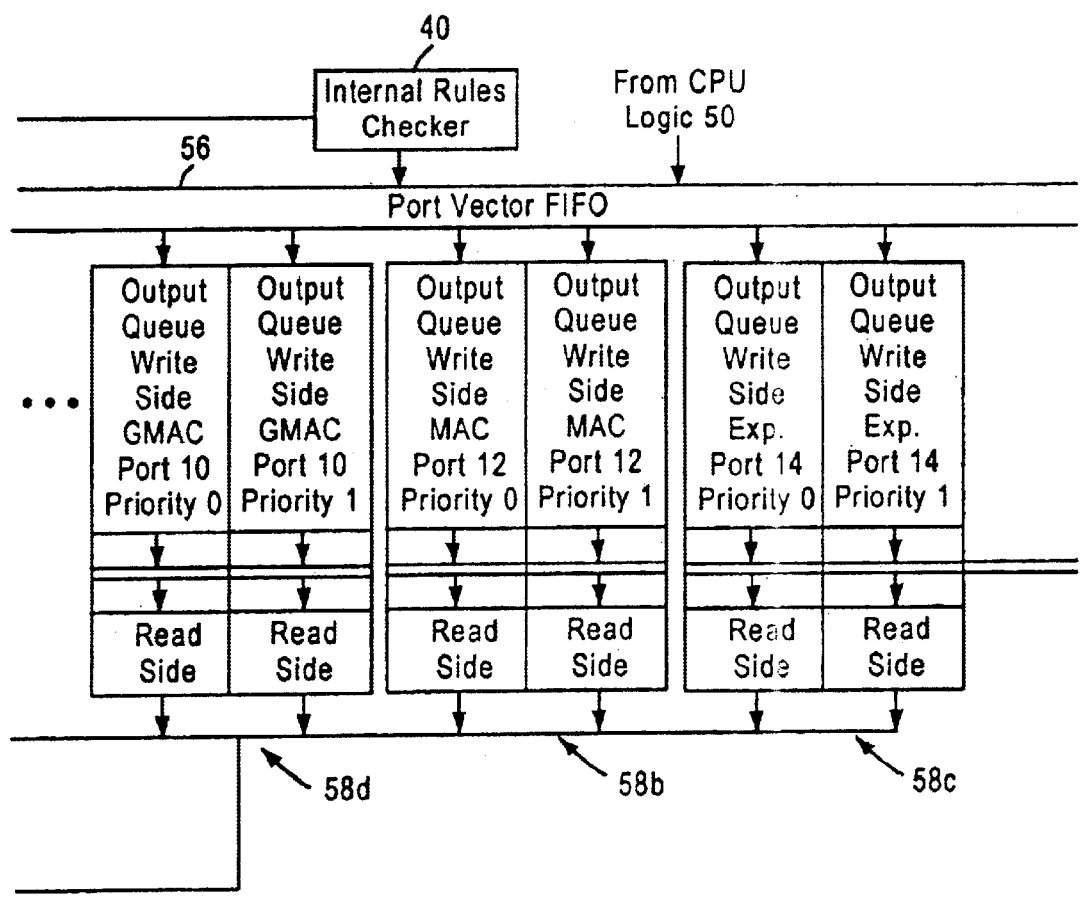
FIG. 3 is a block diagram illustrating in detail the switching subsystem of FIG. 2.
Figure 3C:
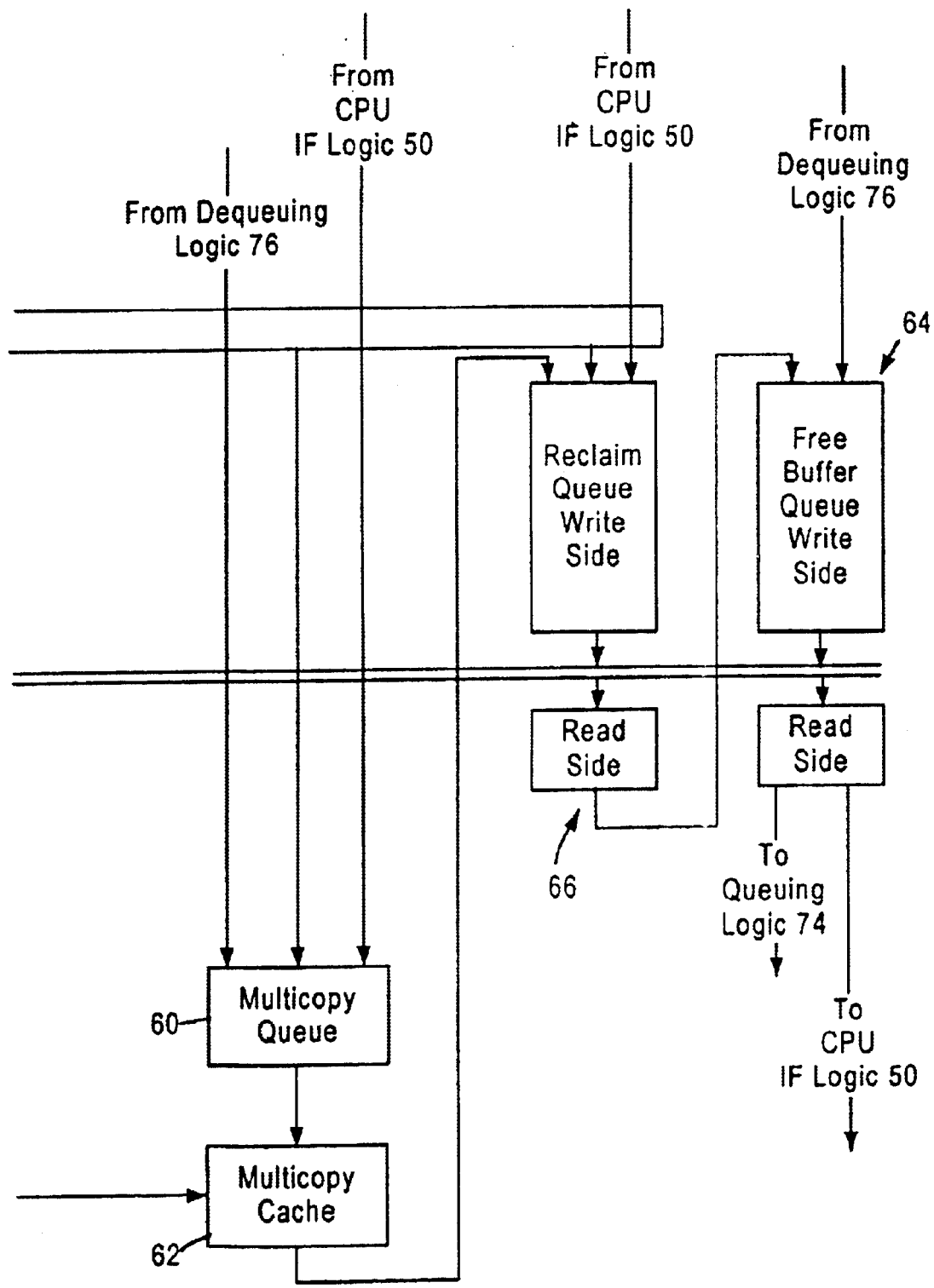

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 by any switch port to the external memory 36, and an SSRAM interface 78 for performing the read and write operations with the SSRAM 36. In particular, the switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot based on the retrieved frame pointer. The frame is stored in the location pointed to by the free buffer pointer obtained from the free buffer pool 64, although a number of other buffers may be used to store a frame, as will be described.

The rules checker 40 also receives the frame pointer and the header information (including source address, destination address, VLAN tag information, etc.) by monitoring (i.e., snooping) the DMA write transfer on the write data bus 69a The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the queues 58 or the management queue 68, should receive the associated frame pointer. The port vector FIFO 56 places the frame pointer into the top of the appropriate queue 58 and/or 68. This queues the transmission of the frame. The output queue 58 is processed separately by the host CPU 32 via the CPU interface 50.

As shown in FIG. 3, each of the transmit MAC units 70d, 70e, 70f, 72d, and 72c have an associated output queue 58a, 58*b*, 58*c*, 58*d*, and 58*e*, respectively. Preferably, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example the output queue 58*e* for the gigabit transmit MAC 72*c*. The dequeuing logic 76 for the transmit gigabit port 24*b* takes the frame pointer from the corresponding gigabit port output queue 58*e*, and issues a request to the scheduler 80 to read the frame data from the external memory 36 at the memory location specified by the frame pointer. The scheduler 80 schedules the request, and issues a grant for the dequeuing logic 76 of the transmit gigabit port 24*b* to initiate a DMA read. In response to the grant, the dequeuing logic 76 reads the frame data (along the read bus 69*b*) in a DMA transaction from the location in external memory 36 pointed to by the frame pointer, and stores the frame data in the internal transmit FIFO for transmission by the transmit gigabit MAC 72*c*. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the frame will be transmitted. The frame pointer is placed into each of the appropriate output queues 58 and transmitted by the appropriate transmit MAC units 20*b*, 24*b*, and/or 30*b*.

The free buffer pool 64, the multicopy queue 60, the reclaim queue 66, and the multicopy cache 62 are used to manage use of frame pointers and reuse of frame pointers once the frame has been transmitted to its designated output port(s). In particular, the dequeuing logic passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO also copies the frame pointer and the copy count to the multicopy queue 60. The multicopy queue writes the copy count to the multicopy cache 62. The multicopy cache is a random access memory having a single copy count for each buffer in external memory (i.e., each frame pointer).

Once the dequeuing logic 76 retrieves the frame data for a particular output port based on a fetched frame pointer and stores the frame data in the transmit FIFO, the dequeuing logic checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list chain of frame pointers to identify the entire stored data frame. The reclaim queue 66 traverses the chain of buffer locations identified by the frame pointers, and passes the frame pointers to the free buffer queue 64.

As discussed above, the internal rules checker (IRC) 40 monitors (i.e., "snoops") the data bus to determine the frame pointer value and the header information of the received frame (including source, destination, and VLAN address information). The IRC 40 uses the frame pointer value and the associated header information to determine which MAC ports will output the data frame stored at the location specified by the frame pointer.

Figure 4:
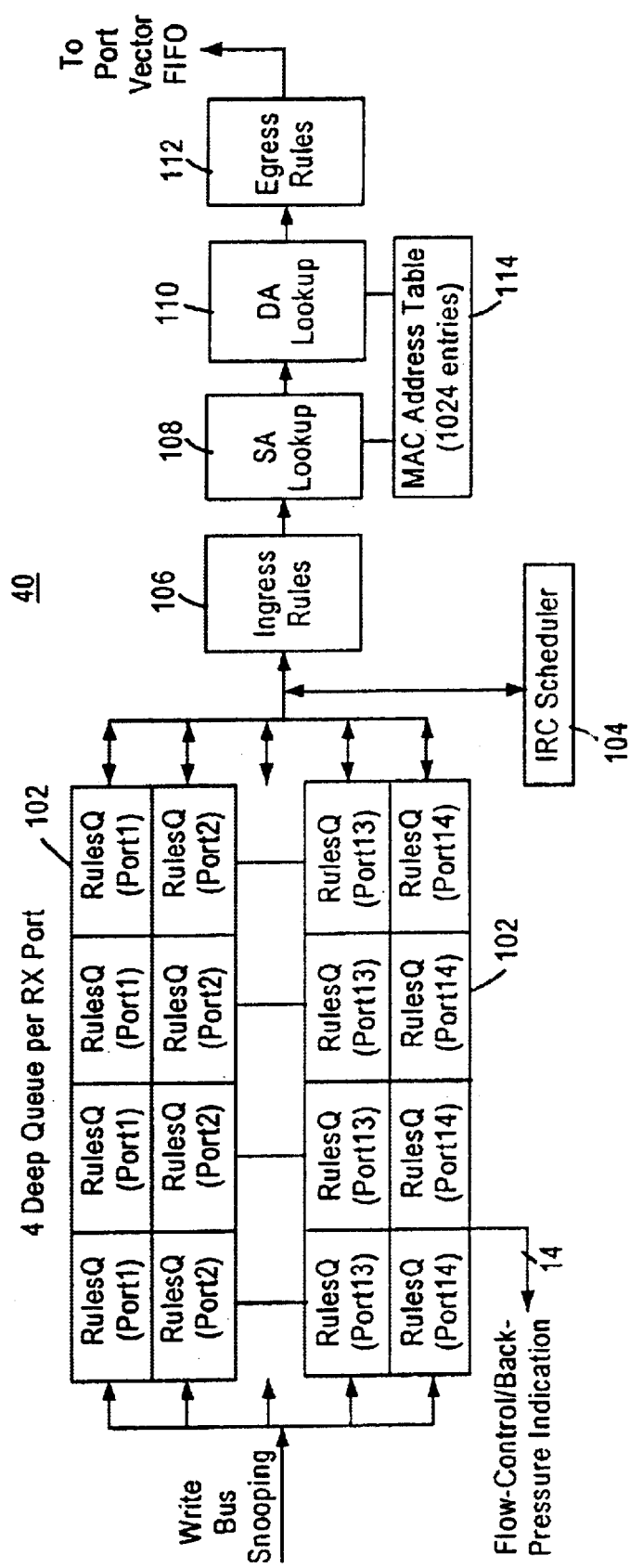
FIG. 4 is a block diagram of an internal rules checker.

As shown in FIG. 4, the IRC 40 may contain multiple rules queue 102 having frame pointers and frame header information. A single rules queue 102 may be assigned to each receive port of the IMS 12. In particular, rules queues 1 to 12 are provided for 10/100 MAC ports 1 to 12 configured to receive data from the corresponding 10/100 Mb/s network stations 14, a rules queue 13 may be arranged to support the gigabit MAC port 24 capable of receiving data from the gigabit network node 22, and a rules queue 14 may be assigned to the expansion port 30. Each rules queue 102 holds frame headers in a synchronous random access memory (SRAM) having four 40-byte entries, and stores frame pointers in a SRAM having four 13-bit entries.

The IRC 40 monitors the data bus 68 to place in each rules queue 102 the header information and frame pointers transferred by the queuing logic 74 of the corresponding receive MAC module to the external memory 36. An IRC scheduler 104 controls the transfer of data held by each rules queue 102 from the corresponding rules queue 102 to IRC logic circuits such as ingress rules logic 106, source address (SA) lookup logic 108, destination address (DA) lookup logic 110 and egress rules logic 112 to produce a forwarding descriptor supplied to the port vector FIFO 56.

The ingress rules logic 106 detects whether a frame was received with an error and checks for preset DA and VLAN information. If an error is detected or the frame address information does not match with allocated DA addresses or VLAN data, the ingress rules logic 106 produces a forwarding descriptor with a null port vector. This forwarding descriptor is transferred directly to the port vector FIFO 56 without performing SA and DA lookup operations and egress rules operations.

The SA and DA lookup logic circuits 108 and 110 search an IRC MAC address table 114 for entries associated with the MAC source and destination addresses for the corresponding frame. If source and destination address data of a frame match with the address table entries, the egress rules logic 112 checks each transmit port in the port vector list produced by the DA lookup logic circuit 110 to remove or mask the disabled ports, the ports that do not belong to a required VLAN, and the port, from which the frame is received. As a result, the egress rules logic 112 generates a forwarding descriptor including a port vector identifying each MAC port that should receive the corresponding frame.

The IRC logic circuitry performs sequential processing of data held in rules queues 102. The data from each rules queue is transferred to the IRC logic circuitry in successive time slots. The IRC scheduler 104 provides arbitration between the rules queues 102 to allocate a time slot, during which data from a given rules queue 102 will be transferred to the IRC logic circuitry. In particular, when a rules queue 102 has data to be processed by the IRC logic circuitry, the rules queue 102 sends to the IRC scheduler 104 a request for the time slot. In response, the IRC scheduler 104 produces grant signals supplied to the rules queue 102 to enable it to transfer its data to the IRC logic circuitry a frame header from a given port will be processed by during the allocated time slot.

Figure 5:
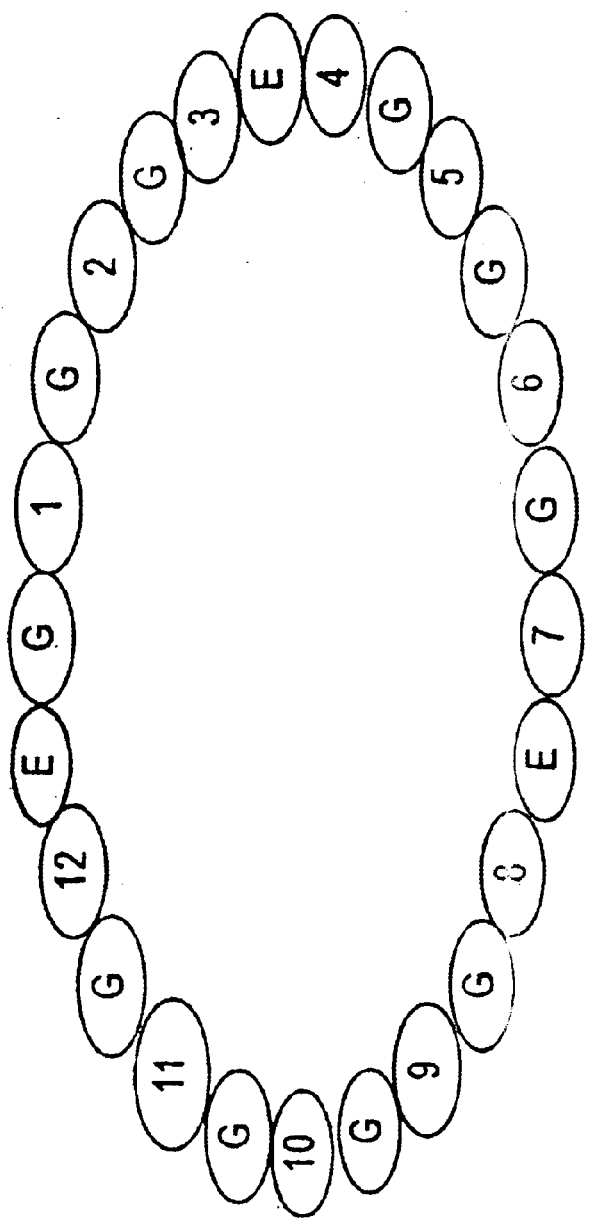
FIG. 5 is a diagram illustrating time slots assigned to various ports of the switch.

Each rules queue 102 is initially assigned with at least one time slot in each scheduling cycle of the IRC scheduler 104. FIG. 5 illustrates an exemplary scheduling cycle of the IRC scheduler 104 having 25 time slots for the rules queues 102. Each time slot may be equal to 5 clock cycles. One time slot may be assigned to each rules queue representing the 10/100 MAC ports 1–12, 10 time slots may be assigned to the rules queue representing the gigabit MAC port 24, and 3 time slots may be assigned to the rules queue that supports the expansion port 30.

As shown in FIG. 5, the time slots in the scheduling cycle are arranged as follows: G1G2G3E4G5G6G7E8G9G10G11G12E, where G indicates the time slots assigned to rules queue that represents the gigabit MAC port 24, E indicates the time slots assigned to the rules queue that supports the expansion port 30, and numerals 1to 12 indicate the time slots assigned to the rules queues representing the 10/100 MAC ports 1 to 12, respectively.

Thus, the first time slot in the scheduling cycle may be assigned to the rules queue 102 that represents the gigabit MAC port 24 (G), the second time slot may be assigned to rules queue 102 that supports the MAC port 1, the third time slot may be assigned to rules queue 102 representing the gigabit MAC port 24 (G), etc. Finally, the last time slot in the scheduling cycle may be assigned to the rules queue 102 supporting the expansion port 30.

Each individual port has a priority in accessing the time slots assigned to that port Hence, when a rules queue 102 for a given port requests the time slot assigned to that port, its request is granted, even if the other rules queues request time slots. However, when no data are supplied to the internal rules checker from a port assigned with a current time slot, the bandwidth allocated to that port would be wasted, whereas processing of frame headers from the overloaded ports might be delayed because the bandwidth allocated to them is not sufficient.

Figure 6:
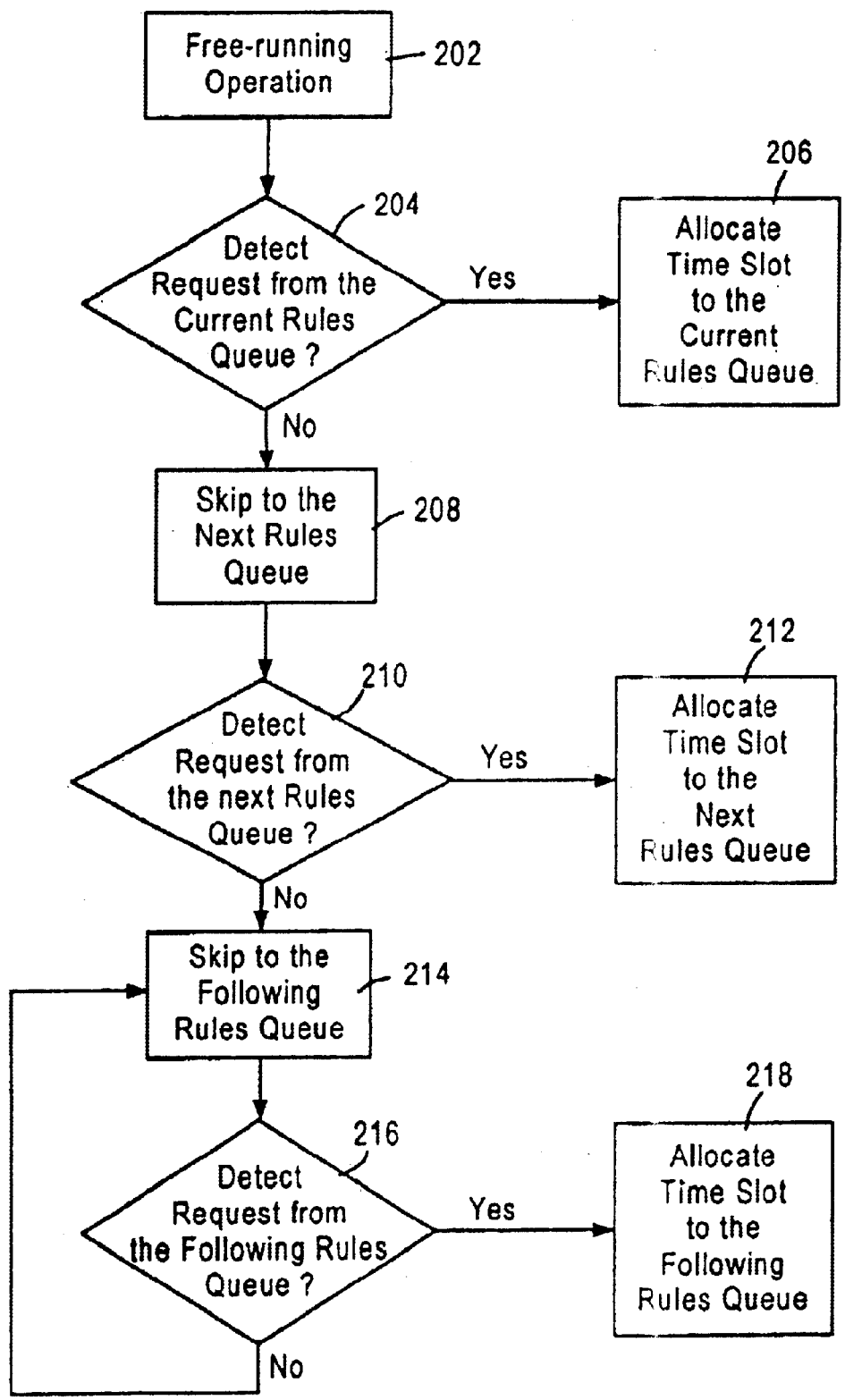
FIG. 6 is a flow chart illustrating dynamic allocation of the time slots in accordance with the present invention.

In accordance with the present invention, the IRC scheduler 104 is provided with a system for dynamically allocating time slots to the rules queues 102. Referring to FIG. 6, the IRC scheduler 104 operates in a free-running mode (block 202) to allocate successive time slots to rules queues 102 representing various ports. When the IRC scheduler 104 performs arbitration for access to a current time slot, it detects whether or not the rules queue 102 assigned with the current time slot requests a time slot (block 204). If a request from this rules queue is detected, then the IRC scheduler allocates the current time slot to the rules queue 102 assigned with the current time slot (block 206). For example, if the IRC scheduler 104 allocates the first time slot in the scheduling cycle illustrated in FIG. 5, it detects whether the rules queue 102 representing the gigabit MAC port 24 requests a time slot. If a request from this rules queue 102 is detected, the IRC scheduler 104 allocates the first time slot to the rules queue representing the gigabit MAC port 24.

However, if no request from the current rules queue 102 is detected, the IRC scheduler 104 skips to the rules queue 102 assigned with the next time slot (block 208), and detects whether that rules queue 102 requests a time slot. If a request from the rules queue 102 assigned with the next time slot is detected, the IRC scheduler 104 allocates the current time slot to that rules queue 102 (block 212). For example, if the rules queue 102 representing the gigabit port 24 does not request a time slot, the IRC scheduler 104 detects whether the rules queue 102 representing the 10/100 MAC port 1 requests a time slot. If a request from that rules queue is detected, the IRC scheduler 104 allocates the first time slot to the rules queue representing the 10/100 MAC port 1.

If no request from the next rules queue is received, the IRC scheduler 104 skips to the rules queue 102 assigned with the following time slot (block 214). The IRC scheduler 104 detects whether a request for a time slot from the rules queue assigned with the following time slot is received (block 216), and if so the current time slot is allocated to that rules queue (block 218). For example, if the rules queues representing the gigabit MAC port 24 and the 10/100 port 1 do not request a time slot, the first time slot is allocated to the rules queue representing the 10/100 port 2.

Hence the IRC scheduler 104 successively polls the rules queue assigned with time slots following the current time slot, and allocates the current time slot to the first rules queue that requests a time slot. Then, the IRC scheduler 104 goes to allocating the net time slot, and repeats operations 204 to 218 for the next time slot.

Thus, time slots assigned to rules queues representing underloaded ports are dynamically allocated to rules queues representing overloaded ports. Therefore, the present invention increases efficiency of bandwidth utilization. In this disclosure, there are shown and described only the preferred embodiments of the invention, but it is to be understood that the invention is capable of changes and modifications within the scope of the inventive concept as expressed herein.

What is claimed is:

1. A multiport data communication system for switching data packets between ports, the data communication system comprising:

a plurality of receive ports for receiving data packets, a decision making engine responsive to the received data packets for controlling transmission of the received data packets to at least one selected transmit port, the decision making engine including:

a plurality of queuing devices corresponding to the plurality of the receive ports for queuing data blocks representing the data packets received by the corresponding receive ports, logic circuitry for receiving the data blocks from the plurality of queuing devices in successive time slots to identify the at least one selected transmit port for each data packet, and a scheduler interacting with the plurality of queuing devices for dynamically allocating each of the time slots to one of the plurality of queuing devices in accordance with data traffic at the corresponding receive ports, wherein the scheduler is configured to receive a request for a time slot from a queuing device of the plurality of queuing devices when the queuing device holds data to be processed by the logic circuitry.

2. The system of claim 1, wherein each of the plurality of the queuing devices is assigned with at least one of the time slots in each scheduling cycle.

3. The system of claim 2, wherein the scheduler is configured to allocate a first time slot assigned to a first queuing device to a second queuing device if no request for a time slot is received from the first queuing device.

4. The system of claim 3, wherein the second queuing device is assigned with a second time slot following the first time slot.

5. The system of claim 4, wherein the scheduler is configured to allocate the first time slot to a third queuing device if no request for a time slot is received from the second queuing device.

6. The system of claim 5, wherein the third queuing device is assigned with a third time slot following the second time slot.

7. A multiport data communication system for switching data packets between ports, the data communication system comprising:

a plurality of receive ports for receiving data packets, a decision making engine responsive to the received data packets for controlling transmission of the received data packets to at least one selected transmit port, the decision making engine including:

a plurality of queuing devices corresponding to the plurality of the receive ports for queuing data blocks representing the data packets received by the corresponding receive ports, logic circuitry for receiving the data blocks from the plurality of queuing devices in successive time slots to identify the at least one selected transmit port for each data packet, and a scheduler interacting with the plurality of queuing devices for dynamically allocating each of the time slots to one of the plurality of queuing devices in accordance with data traffic at the corresponding receive ports, wherein the logic circuitry comprises ingress rules logic for receiving the data block to check whether the corresponding data packets are received with an error.

8. The system of claim 7, wherein the logic circuitry further comprises source address lookup logic for comparing a source address of the data packets with a preset source address.

9. The system of claim 8, wherein the logic circuitry further comprises destination address lookup logic for comparing a destination address of the data packets with a preset destination address.

10. The system of claim 9, wherein the logic circuitry further comprises egress rules logic for producing a port vector identifying the at least one selected transmit port.

11. In a communication system having a plurality of receive ports, at least one transmit port, and a decision making engine for controlling data forwarding between a receive port of said plurality of receive ports and the at least one transmit port, a method of data processing comprising the steps of:

placing data blocks representing received data packets in a plurality of data queues corresponding to the plurality of the receive ports, transferring the data queues in successive time slots to logic circuitry for determining the at least one transmit port, and dynamically allocating the time slots to the data queues in accordance with data traffic at the corresponding receive ports, wherein the time slots assigned to the data queues representing underloaded receive ports are dynamically allocated to the data queues representing overloaded receive ports.

12. The method of claim 11, wherein a first time slot assigned to a first data queue is allocated to the first data queue if the first data queue contains data to be processed.

13. The method of claim 12, wherein the first time slot is allocated to a second data queue does not contain data to be processed.

14. The method of claim 13, wherein the second data queue is assigned with a second time slot following the first time slot.

15. The method of claim 14, wherein the first time slot is allocated to a third data queue if the first and second data queues do not contain data to be processed.

16. The method of claim 15, wherein the third data queue is assigned with a third time slot following the second time slot.

* * * * *

UNITED STATES PATENT AND TRADEMARK OFFICE
CERTIFICATE OF CORRECTION

PATENT NO. : 6,895,015 B1
DATED : May 17, 2005
INVENTOR(S) : John Chiang et al.

It is certified that error appears in the above-identified patent and that said Letters Patent is hereby corrected as shown below:

Column 12,
Line 28, after "queue" insert -- if the first data queen --

Signed and Sealed this

Twelfth Day of July, 2005

JON W. DUDAS
*Director of the United States Patent and Trademark Office*